Jan. 27, 1959  M. FOGIEL  2,871,429
POTENTIOMETER CONTROLLED FOLLOW-UP SYSTEM
Filed Oct. 4, 1956

— — — MECHANICAL TRANSMISSION LINES

INVENTOR.
Max Fogiel

United States Patent Office 2,871,429
Patented Jan. 27, 1959

2,871,429
POTENTIOMETER CONTROLLED FOLLOW-UP SYSTEM

Max Fogiel, New York, N. Y.

Application October 4, 1956, Serial No. 613,981

7 Claims. (Cl. 318—29)

This invention relates to a circuit which serves as an effective substitute for three dimensional cams.

In the application of computers for military purposes it is customary to machine a three dimensional cam shown in Figure 1 whenever it is necessary to obtain an output Z which is a function of two variables $x$, $y$ such as $Z=f(x, y)$. In a typical gun fire control problem Z may correspond to the time of flight of the shell and $x$ and $y$ may correspond respectively to the range and elevation of the target. The accuracy with which the time of flight must be computed under these circumstances makes the generating of the required three dimensional cams a costly and tedious process. Machining of the cam surface is performed by a milling cutter which sinks closely spaced holes to the predetermined depth about the cam surface. This procedure is followed by a generous amount of hand filing which removes the excess material surrounding the holes and leaves a smooth cam surface. These procedures require skilled hands for it is important that the required accuracy be maintained throughout the milling and filing operations. The cam production process in this manner has given rise to a good deal of concern among the parties which are directly connected with it since a new cam is required whenever the nature of the shell such as size or gunpowder is changed. This problem of generating the required analytical relationship by a medium which is flexible to the extent that it does not have to be discarded whenever a new relationship is introduced, is solved in the following manner.

Figure 4:
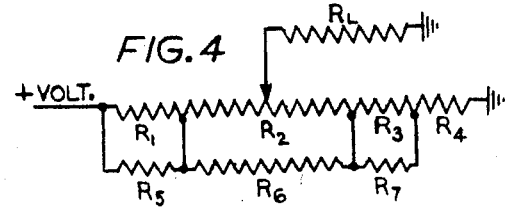

Figure 4 indicates the potentiometer circuit for a given value of $y$.

Figure 5:
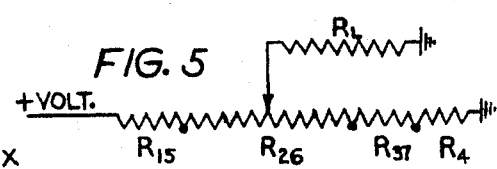

Figure 5 represents the equivalent electrical circuit of Figure 4.

Figure 6:
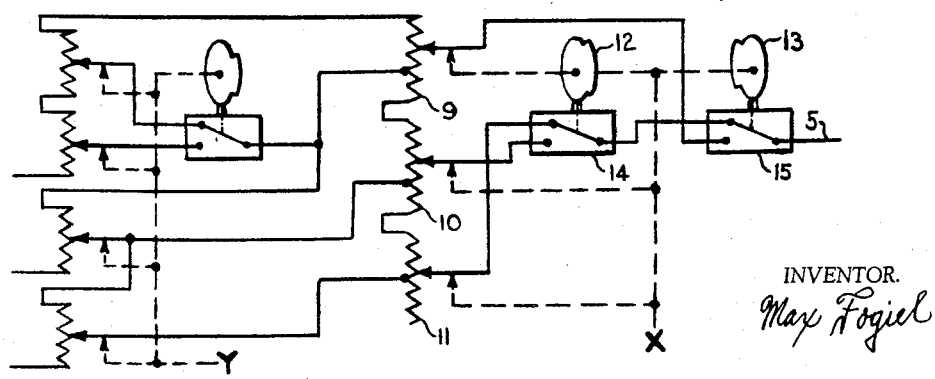

Figure 6 shows a portion of the potentiometer circuit arranged with switches and a number of potentiometers connected in series for the purpose of improving the accuracy.

Figure 1:
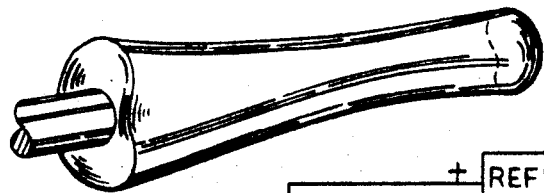
Figure 1 is a diagram of a typical three dimensional cam used in military computer applications.
Figure 2:
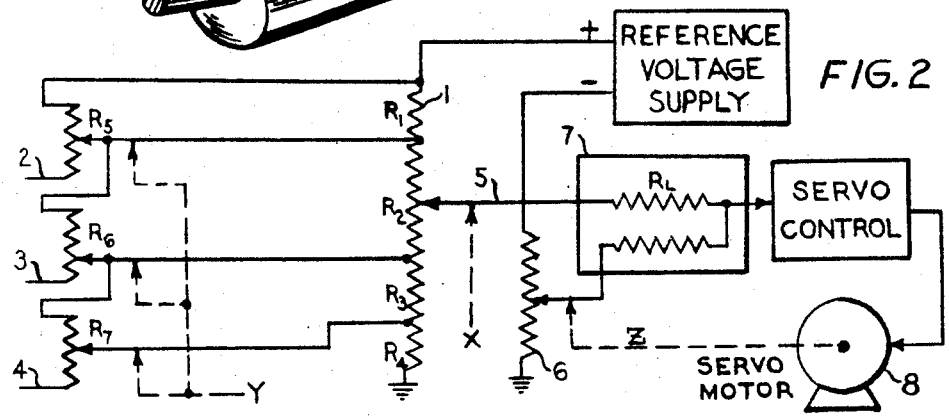
Figure 2 is a functional schematic diagram of the circuit employed for the purpose of developing an output which is a function of two variable inputs and effectively replaces the mechanical three dimensional cam.

The circuit is based on the principle that a linear potentiometer driven by the quanity $x$ may, by connecting proper tap resistors to it, be converted to one which will have an output voltage proportional to a function of $x$ which is nonlinear. For a given arrangement of tap resistors and potentiometer the output will be proportional to a given function of $x$. To change the characteristics of the function it is necessary to change the tap resistors. Consequently, for the case cited where the output Z is a function of both $x$ and $y$, the characteristics of the function of $x$ depend on $y$ and therefore it is necessary to vary the values of the tap resistors in accordance with the demands arising out of the variations in $y$. As shown in Figure 2 the variation of tap resistors with $y$ is accomplished by rotating a number of potentiometers by the quantity $y$. One potentiometer is provided for each tap resistor. The location of the tap points on potentiometer 1 and the magnitudes of the tap resistors may be determined by the following method.

Figure 3:
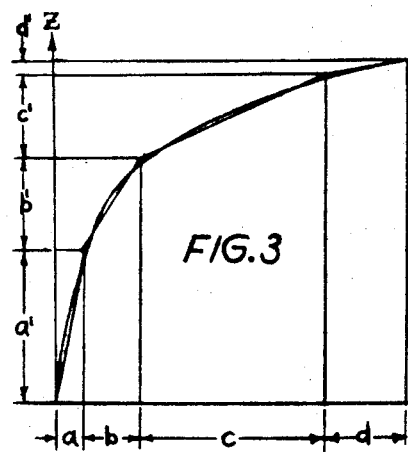
Figure 3 shows the straight line approximation of a typical relationship of output Z as a function of $x$ for a given value of $y$.

For the purpose of illustration assume that corresponding to the value $y=y_1$, the output $Z=f(x, y_1)$ is as shown by the curve in Figure 3. The best tap locations may be approximately determined by superimposing upon the smooth curve a number of straight intersecting lines which approximate the curve to the accuracy desired. The taps are then located at the points where the straight lines intersect. The greater the accuracy desired the greater the number of taps for a given function. Assuming that the load $R_L$ does not impose an appreciable loading effect upon potentiometer 1, the magnitudes of the resistors connected between tap points are computed on the basis that the output of potentiometer 1 at the tap points is to coincide with the ordinates of the points at which the straight lines intersect. If, however, the loading effect arising as a result of the condition that load $R_L$ draws current from potentiometer 1 attains a significant value, it may be desirable to take advantage of this effect by computing the values of the tap resistors on the basis that the output of potentiometer 1 at the tap points is to coincide with the ordinates of the function rather than the ordinates of the straight line intersections. Because of the loading effect the potentiometer output will not be linear betwen tap points and may under optimum circumstances follow very nearly along the ordinates of the given function. This then indicates that the loading effect may be employed to produce beneficial results.

The circuit of potentiometer and corresponding tap resistors for a given value of $y$ is shown in Figure 4. $R_1$ is in parallel with $R_5$, $R_2$ with $R_6$, and $R_3$ with $R_7$. Let the equivalent resistances of these parallel combinations be represented by $R_{15}$, $R_{26}$, and $R_{37}$ respectively. Then the potentiometer may also be represented as shown in Figure 5. Using the nodal method of circuit analysis, $$\frac{V-V_x}{R_{15}+R_{26}+R_{37}}=V_x\left(\frac{1}{R_L}+\frac{1}{R_4}\right)$$

from which $$\frac{V_x}{V}=\frac{R_L Re}{Re(R_t-Re)+R_L R_t} \qquad (1)$$

where $R_t=R_{15}+R_{26}+R_{37}+R_4$ and $Re$ is the equivalent resistance of the potentiometer which is in parallel with the load resistance.

The magnitudes of $R_1$, $R_2$, $R_3$, and $R_4$ are determined from the following relations, $$R_1=\frac{aR_0}{a+b+c+d}; \quad R_2=\frac{bR_0}{a+b+c+d} \cdots \text{etc.} \quad (2)$$

where $R_0=R_1+R_2+R_3+R_4$.

The values of the equivalent resistances $R_{15}$, $R_{26}$, $R_{37}$ may be computed by inserting the ratios $a'/d'$, $b'/d'$, $c'/d'$ ... $r_n$ into Equation 1 respectively and solving for $Re$.

$$Re=\frac{1}{2}\left[\left(R_t-\frac{R_L}{r_n}\right)+\sqrt{\left(\frac{R_L}{r_n}-R_t\right)^2+4R_L R_t}\right] \quad (3)$$

$R_t$ is obtained by substituting into Equation 1 the relations $$\frac{V_x}{V}=\frac{a'}{d'}=K, \quad Re=R_4$$

from which $$R_t=\frac{R_4(KR_4+R_L)}{K(R_4+R_L)} \qquad (4)$$

the section of the curve which contains the greatest slope is the one where no parallel tap resistor is required.

This procedure of computing the values of tap resistors for potentiometer 1 is repeated for all values of $y_1, y_2, y_3, \ldots y_n$ where the characteristics of the function vary.

After values of $R_5$, $R_6$, and $R_7$ have been computed for different values of $y$, it will in general be found that the resistances of tapping potentiometers 2, 3, and 4 do not vary linearly with $y$. Under such circumstances it is possible to either insert potentiometers having the required functional windings or tapping linear potentiometers at the yoints $y_1, y_2, y_3 \ldots y_n$ and connecting across these tap points the required parallel resistors. The magnitudes of these resistors are readily computed from the condition that the equivalent parallel combination must equal the corresponding value of the preceding tap resistors. These resistors may be of the fixed type or variable resistors may be set to the correct value.

The electrical output Z may be converted to one of the mechanical form by connecting the output 5 to the signal leg of a nulling or summing network 7 and the feedback leg of this network to a linear potentiometer 6 whose applied voltage is oppositely directed to that of potentiometer 1. The servo motor will drive and position potentiometer 6 so that the magnitudes of the currents in both legs of the network are equal. In this manner the shaft position of potentiometer 6 is proportional to the quantity Z. With the output Z thus established in the form of a mechanical quantity, the circuit of Figure 2 is a direct and effective substitute for three dimensional cams.

As already mentioned, it is important to maintain a given accuracy in the computation of the output Z. The computational accuracy may be increased by employing multi-turn potentiometers, increasing the number of tap points on the potentiometers, and increasing the applied reference voltage.

The degree of accuracy with which the characteristics of the desired function are reproduced by the circuit may be increased to any amount by increasing the number of tap points on potentiometer 1. If the number of tap points obtainable on a multi-turn potentiometer prove to be insufficient, any number of single turn potentiometers may be connected in series as shown in Figure 6 to obtain the required number of tap points. Cams 12 and 13 which are positioned by the quantity $x$ operate switches 14 and 15 in a manner so that the potentiometer wiper arm corresponding to a given region of $x$ is properly selected. The circuit is arranged so that there will be no indeterminate output over the $x$ range. Regardless of the exact values of $x$ at which the switches are depressed, one of the number of potentiometers present will always be in the circuit. The switches have the property where a slight depression causes the switch pole to spring to the bottom contact. Thus the switch pole will never remain stationary at some point between the contacts. It will always connect one or the other contact. Thus switches 14 and 15 will be in the released position shown whenever the value of $x$ falls within the region designated to potentiometer 11. When $x$ is within the region designated to potentiometer 10 switch 14 is depressed and the wiper arm of potentiometer 10 is connected to the input leg of the summing network 7. In a similar manner switches 14 and 15 are both depressed to connect the wiper arm of potentiometer 9 to network 7 when $x$ falls within the corresponding region. Switching circuits similar to the ones already discussed make it possible to connect in series a number of single turn potentiometers between a given pair of tap points and thus increase the accuracy of the tapping resistors to any degree desirable.

Changing the nature of the shell fired and consequently the function $Z = f(x, y)$, does not invalidate the main components of the system. The functional windings of potentiometers 2, 3, and 4 are the only elements which are thereby affected. Indeed, if these potentiometers are actually linear ones having tapping resistors connected to them in order to have them effectively produce the required function, it will only be necessary to change the magnitudes of these tapping resistors through a setting procedure.

I claim:

1. A three dimensional cam circuit comprising in combination a first potentiometer the sliding member of which is positioned by one of two independent variables to provide variable voltage for different positions of said sliding member, tap points located on the resistance element of said potentiometer to allow resistance to be connected in parallel with segments of said resistance element, secondary potentiometers connected in parallel with the resistance segment between adjacent tap points of said resistance element to provide variable resistance of said segment as required by the variation of the second of said two independent variables, the sliding members of said secondary potentiometers being positioned by the second of said two independent variables, a voltage supply to energize the resistance element of said first potentiometer, a summing network the signal leg of which is connected to the voltage output of said sliding member of said first potentiometer to serve as nulling means in a servo system for converting the electrical output of said first potentiometer into mechanical form, a servo motor to position a mechanical shaft in proportion to the magnitude of the voltage output of said first potentiometer, a servo control to control said servo motor in accordance with the error signal from said summing network, a feedback potentiometer positioned by the shaft of said servo motor to provide feedback voltage to said summing network and complete the servo loop, and a voltage supply to energize the resistance element of said feedback potentiometer.

2. The three dimensional cam circuit of claim 1 wherein said first potentiometer consists of several potentiometers the resistance elements of which are connected in series and the sliding members of which are connected to a switching circuit to increase the accuracy with which the potentiometer may be positioned by the first of said two independent variables.

3. The three dimensional cam circuit of claim 2 wherein said switching circuit consists of a series of cam operated switches, said cams being positioned by the first of said two independent variables.

4. The three dimensional cam circuit of claim 3 wherein the unoperated contact of a switch of said switching circuit is connected to the center arm of the preceding switch and the operated contact of said switch is connected to the sliding member of said series potentiometer corresponding to the range designated by said cam operating said switch.

5. The three dimensional cam circuit of claim 1 wherein said secondary potentiometer consists of several potentiometers the resistance elements of which are connected in series and the sliding members of which are connected to a switching circuit to increase the accuracy with which the potentiometer may be positioned by the second of said two independent variables.

6. The three dimensional cam circuit of claim 5 wherein said switching circuit consists of a series of cam operated switches, said cams being positioned by the second of said two independent variables.

7. The three dimensional cam circuit of claim 6 whereing the unoperated contact of a switch of said switching circuit is connected to the center arm of the preceding switch and the operated contact of said switch is connected to the sliding member of said series potentiometer corresponding to the range of the second independent variable designated by said cam operating said switch.

References Cited in the file of this patent

UNITED STATES PATENTS

| | | |
|---|---|---|
| 2,443,098 | Dean | June 8, 1948 |
| 2,790,303 | Kutzler | Apr. 30, 1957 |